(12) United States Patent
Lake

(10) Patent No.: US 7,046,159 B2
(45) Date of Patent: May 16, 2006

(54) MARKETING DISPLAY

(75) Inventor: Malcolm D. Lake, Bristol (GB)

(73) Assignee: Dok-Tek Systems Limited, Bristol (GB)

( * ) Notice: Subject to any disclaimer, the term of this patent is extended or adjusted under 35 U.S.C. 154(b) by 152 days.

(21) Appl. No.: 10/780,461

(22) Filed: Feb. 17, 2004

(65) Prior Publication Data

US 2005/0099316 A1    May 12, 2005

Related U.S. Application Data

(60) Provisional application No. 60/518,174, filed on Nov. 7, 2003.

(51) Int. Cl.
  *G08B 5/00*    (2006.01)
(52) U.S. Cl. .................... 340/815.4; 348/563; 352/200
(58) Field of Classification Search ............ 340/815.4; 348/563; 725/32, 36, 136; 345/7; 705/14; 352/200; 40/442
  See application file for complete search history.

(56) References Cited

U.S. PATENT DOCUMENTS

| 2,723,591 | A | | 11/1955 | Taylor |
| 3,018,686 | A | | 1/1962 | Kurz |
| 5,075,789 | A | * | 12/1991 | Jones et al. .................... 349/7 |
| 5,194,008 | A | * | 3/1993 | Mohan et al. ................. 434/22 |
| 5,221,962 | A | | 6/1993 | Backus et al. |
| 2004/0034874 | A1 | * | 2/2004 | Hord et al. .................. 725/136 |
| 2004/0142745 | A1 | * | 7/2004 | Hosaka ........................ 463/31 |

FOREIGN PATENT DOCUMENTS

| CH | 676756 A5 | 2/1991 |
| DE | 29918741 U1 | 12/1999 |
| EP | 0562327 A1 | 9/1993 |
| FR | 2406225 | 5/1979 |

* cited by examiner

*Primary Examiner*—Toan N. Pham
(74) *Attorney, Agent, or Firm*—King & Schickli, PLLC

(57) ABSTRACT

The marketing apparatus is arranged to direct a light from a source (10) at a surface (12). The light source is configured to intermittently project a pattern onto the surface and the pattern is perceived primarily subliminally by a viewer.

14 Claims, 1 Drawing Sheet

MARKETING DISPLAY

The present applications claims priority from U.S. Provisional Application Ser. No. 60/518,174 filed on 7th Nov. 2003.

FIELD OF THE INVENTION

The present invention relates to a marketing display.

BACKGROUND TO THE INVENTION

Companies are continually looking for new ways in which to increase sales of their goods or services. In outlets such as supermarkets, signs or banners are displayed prominently which advertise goods or special offers. Many shoppers have become accustomed to such advertisements and do not pay them much attention. Other less direct techniques such as wafting pleasant smells (e.g. fresh bread) near a food aisle have also been tried. There are claims that this can help increase food sales as it can make shoppers feel more hungry or put them in a pleasant mood.

There is also some evidence to show that "subliminal" advertising techniques can help improve sales. It is known to briefly display an image on a screen during a film or television programme. A viewer may not be consciously aware of the image, but he/she may still be affected by it, e.g. quickly flashing up an image of a cold drink can cause some members of an audience buy a drink. In some countries there are rules regarding the use of such techniques in video presentations but they may be freely used in other types of media.

SUMMARY OF THE INVENTION

Embodiments of the present invention are intended to affect consumers so that they may be more conducive to buying goods or services.

According to a first aspect of the present invention there is provided marketing apparatus including:

a surface, and a light source directed at the surface, the light source configured to intermittently project a pattern onto the surface, in use, the pattern being perceived primarily subliminally by a viewer.

Definitions of "subliminal" vary; however, a widely-used definition is something that exists in the mind, but below the surface or threshold of consciousness, i.e. existing as feeling rather than as clear ideas. In the case of the present apparatus, the viewer may only be consciously aware of a faint flickering light on the surface (or may not be consciously aware of the light at all), but tests have shown that the light can have an emotional effect on viewers. Unlike conventional adverts/displays, the light pattern projected by the apparatus is not intended to be perceived (or read) mainly at a conscious level by the viewer. In fact, the light pattern may not direct the viewer's conscious mind to the surface or the apparatus at all, but it may produce an emotional effect in the viewer, although he/she may not be aware of the source of the feeling.

The pattern is typically intended to represent something that is intended to bring about a pleasant sensation in the viewer. In one example the pattern includes a representation of a human face. In particular, the pattern may represent a smiling mouth, possibly along with eyes. However, it will be understood that other images or words can be used.

The frequency at which the light source is turned on and off to intermittently project the pattern may be in the range of 60 to 120 beats per minute. The light source may emit a light of a single colour (e.g. white) or it may be multi-coloured.

The pattern may be formed using an array of bulbs, LEDS and/or other suitable light sources.

The distance between the light source and the surface may vary. For example, it may be in the range of about 1 to 4 metres. Tests have shown that a viewer may be affected by the reflected light pattern whether or not it is in focus on the surface. The surface may include an advertisement.

According to another aspect of the present invention there is provided an installation incorporating a marketing apparatus substantially as described herein.

According to yet another aspect of the present invention there is provided marketing apparatus including a light source configured to intermittently project a pattern, in use, the pattern being perceived primarily subliminally by a viewer. In such a case the light may be projected generally towards the eyes of the viewer rather than being reflected off a surface towards the viewer.

According to a further aspect of the present invention there is a method of transmitting (presenting/displaying) a "subliminal" advertising message including a step of intermittently projecting a light pattern, in use, the pattern being perceived primarily subliminally by a viewer. The light pattern may be reflected from a surface towards the viewer.

Whilst the invention has been described above, it extends to any inventive combination of the features set out above or in the following description.

BRIEF DESCRIPTION OF THE DRAWINGS

The invention may be performed in various ways, and, by way of example only, an embodiment thereof will now be described, reference being made to the accompanying drawing, in which.

DETAILED DESCRIPTION OF THE DRAWINGS

Figure 1:
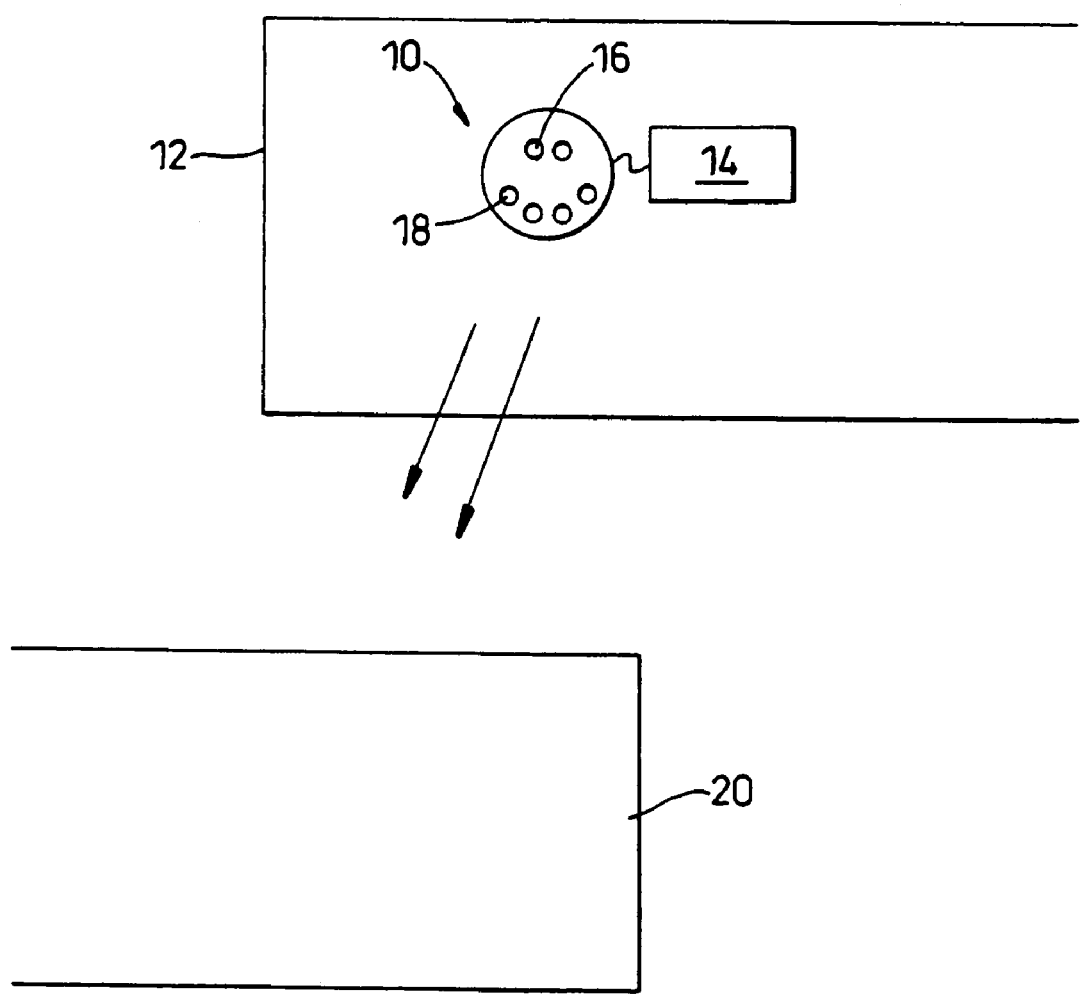
FIG. 1 illustrates schematically an embodiment of the marketing device.

In the FIGURE, a version of the device 10 is shown fitted on a wall 12. The device 10 is connected to a power supply 14, which may be a mains supply or a battery pack. The device 10 may be located so that its front surface is flush with the surface of the wall 12 and it may also match the colour of the wall in order to reduce the visibility of the device itself. Components such as the power supply may be hidden from view altogether, e.g. located behind the wall 12.

The device 10 includes a housing including a plurality of light sources 16, 18. The housing may be substantially circular in shape and have a diameter of around 60 mm, although it will be understood that the device could be made to be of any practical size and size. In some cases the device could be considerably larger than 60 mm in diameter. In the example the light sources are white LEDs, but it will be appreciated that other types of light sources such as bulbs (and not necessarily all white in colour) could be used. The LEDs 16, 18 are connected to known circuitry which causes them to light on/off intermittently. The frequency of the on/off switching may be in a range of around 60 to 120 beats per minute. It is considered that a frequency that approximately matches the anticipated heartbeat of an observer is particularly effective. For example, the frequency may be around 70 beats per minute, which may be the expected heartbeat of a fairly relaxed shopper. The intensity of the LEDs may be such that the light emitted is quite dim so that it is not too distracting for passers-by.

In the example the device 10 includes two LEDs 16 which are spaced apart to represent eyes and a crescent-shaped line of LEDs 18 which represents a smiling mouth.

In use, the device 10 can be installed in a location such a supermarket aisle or near a printed advertisement. However, it will be appreciated that it could also be used in other sites. Shoppers may walk past the device without consciously noticing it but they may perceive the flashing lights at some level.

The device may direct the light generally towards the eyes of passers-by. Alternatively or additionally, the flashing light may be directed at a surface 20, which can be located a certain distance away from the device 10. For example, the distance between the device 10 and the surface 20 may be in the range of 1 to 4 metres. The surface 20 may be a wall or it may be a board or the like displaying an advertisement. The light pattern emitted by the device 10 is reflected on the surface 20. The surface 20 may be positioned so that it is prominent to shoppers, although the device or visible light reflecting upon the surface may not be very prominent. In fact, the light conditions in the shop may be such the light emitted by the apparatus is significantly less bright than the ambient light. Thus, the reflected light pattern may be primarily perceived subliminally by the shoppers.

Tests have shown that people walking by a location where the device is installed find themselves smiling even though they are not aware of the reason why they are smiling. It is believed that the light pattern is perceived primarily subliminally by the passers-by and causes them to smile (possibly because at some level they can visualise the image represented by the light pattern). The emotional effect of smiling can mean that the passer-by is made to feel relaxed and happy and therefore he/she may be more susceptible to buy items than if the device was not operating.

I claim:

1. Marketing apparatus including:
   a surface, and
   a light source directed at the surface, the light source configured to intermittently project a pattern onto the surface wherein the light source is turned on and off at a frequency to intermittently project the pattern in the range of 60 to 120 beats per minute, in use, the pattern being perceived primarily subliminally by a viewer.

2. Apparatus according to claim 1, wherein the pattern includes a representation of a human face.

3. Apparatus according to claim 2, wherein the pattern represents a smiling mouth and eyes.

4. Apparatus according to claim 1, wherein the frequency is 70 beats per minute.

5. Apparatus according to claim 1, wherein the light source emits a light of a single colour (e.g. white).

6. Apparatus according to claim 1, wherein the light source emits multi-coloured light.

7. Apparatus according to claim 1, wherein the pattern is formed using an array of bulbs or LEDs.

8. Apparatus according to claim 1, wherein a distance is provided between the light source and the surface in the range of about 1 to 4 meters.

9. Apparatus according to claim 1, wherein the light pattern reflected on the surface is not in focus to a viewer.

10. Apparatus according to claim 1, wherein the surface includes an advertisement.

11. An installation incorporating a marketing apparatus according to claim 1.

12. Marketing apparatus including a light source configured to intermittently project a pattern at a frequency in the range of 60 to 120 beats per minute such that the pattern is perceived primarily subliminally by a viewer.

13. A method of transmitting a "subliminal" advertising message including a step of intermittently projecting a light pattern at a frequency in the range of 60 to 120 beats per minute, in use, the pattern being perceived primarily subliminally by a viewer.

14. A method according to claim 13, wherein the light pattern is reflected on a surface.

* * * * *